US008611844B2

United States Patent
Su et al.

(10) Patent No.: US 8,611,844 B2
(45) Date of Patent: Dec. 17, 2013

(54) LOW NOISE AMPLIFIER AND METHOD OF INPUT IMPEDANCE CONTROL FOR TERRESTRIAL AND CABLE MODES

(75) Inventors: Yu Su, Austin, TX (US); Mustafa H. Koroglu, Austin, TX (US); Abhishek Kammula, Austin, TX (US); Ramin Khoini-Poorfard, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 167 days.

(21) Appl. No.: 13/344,227

(22) Filed: Jan. 5, 2012

(65) Prior Publication Data

US 2012/0222082 A1 Aug. 30, 2012

Related U.S. Application Data

(63) Continuation-in-part of application No. 13/036,892, filed on Feb. 28, 2011, now Pat. No. 8,238,867.

(51) Int. Cl.
*H04B 1/16* (2006.01)

(52) U.S. Cl.
USPC ............... 455/341; 455/277.1; 455/279.1; 455/552.1; 455/553.1

(58) Field of Classification Search
USPC .......................................... 455/341
See application file for complete search history.

(56) References Cited

U.S. PATENT DOCUMENTS

| 6,771,124 | B1 | 8/2004 | Ezell |
| 6,809,581 | B2 | 10/2004 | Rofougaran et al. |
| 7,403,071 | B2 | 7/2008 | Hollenbeck et al. |
| 7,446,613 | B2 | 11/2008 | Westwick et al. |
| 7,596,364 | B2 | 9/2009 | Sjoland |
| 2007/0052482 | A1 | 3/2007 | Kasha et al. |
| 2008/0139110 | A1* | 6/2008 | Lai et al. ............... 455/3.02 |
| 2010/0120391 | A1 | 5/2010 | Kasha et al. |
| 2012/0014479 | A1* | 1/2012 | Choi ....................... 375/340 |

* cited by examiner

*Primary Examiner* — Ajibola Akinyemi
(74) *Attorney, Agent, or Firm* — Cesari & Reed, LLP; R. Michael Reed

(57) ABSTRACT

A low noise amplifier (LNA) for use in a receiver circuit includes an adjustable impedance network including an input for receiving a radio frequency signal, a plurality of control inputs, and an output. The LNA further includes a controller coupled to the plurality of control inputs and configured to control an impedance of the adjustable impedance network. The controller controls the adjustable impedance network to provide a relatively low impedance in a terrestrial mode and to provide a relatively high impedance in a cable mode.

22 Claims, 3 Drawing Sheets

LOW NOISE AMPLIFIER AND METHOD OF INPUT IMPEDANCE CONTROL FOR TERRESTRIAL AND CABLE MODES

CROSS-REFERENCE TO RELATED APPLICATION(S)

This application is a continuation-in-part of and claims priority to co-pending U.S. patent application Ser. No. 13/036,892 filed on Feb. 28, 2011 entitled "Low Noise Amplifier (LNA) Suitable for Use in Different Transmission Environments and Receiver Using Such an LNA," Which is incorporated herein by reference in its entirety.

FIELD

The present disclosure is generally related to television receiver circuits, and more particularly to a low-noise amplifier for use in receiver circuits that is configurable to receive terrestrial and cable television signals.

BACKGROUND

Receiver circuits are used for both terrestrial and cable reception within televisions, digital video recorders, video cassette records, set-top box devices (such as cable and satellite tuners), frequency modulation (FM) radios, models, and other electronic devices. Some smart phones also utilize receiver circuits for television reception. In general, receiver circuits include a tuner that selects a narrowband signal from within a wide or broad-band signal having multiple channels. The tuner includes bandpass filters, amplifiers, and mixer circuits for selecting a desired channel and for rejecting unwanted channels, noise and interference.

Reception of terrestrial broadcast signals typically needs a very good noise figure, in part, because the terrestrial broadcast signals tend to have large signal power differences from channel to channel. The noise figure (NF) is a measure of degradation of the signal-to-noise ratio (SNR), caused by components in a radio frequency (RF) signal chain. In contrast, cable signal reception typically needs a good return loss to avoid attenuation in the received signal, since, in cable broadcasts, the power tends to be relatively even and well-controlled across the channels. Return loss (RL) or reflection loss is the loss of signal power resulting from the reflection caused at a discontinuity in a transmission line or optical fiber. This discontinuity can be a mismatch with the terminating load or with a device inserted in the transmission line. Unfortunately, there is a tradeoff between the noise figure and the return loss, in part, because impedance matching circuitry that can be used to provide a good return loss can adversely impact the noise figure, and vice versa.

SUMMARY

In an embodiment, a low noise amplifier (LNA) for use in a receiver circuit includes an adjustable impedance network including an input for receiving a radio frequency signal, a plurality of control inputs, and an output. The LNA circuit further includes a controller coupled to the plurality of control inputs and configured to control an impedance of the adjustable impedance network. The controller controls the adjustable impedance network to provide a relatively low impedance in a terrestrial mode and to provide a relatively high impedance in a cable mode.

In another embodiment, a method includes determining a receiving mode of a receiver, where the receiving mode includes one of a terrestrial mode and a cable mode. The method further includes activating a plurality of transistors of an adjustable impedance network in response to determining the receiving mode is a terrestrial mode and activating some, but not all, of the transistors of the adjustable impedance network in response to determining the receiving mode is a cable mode.

In stilt another embodiment, a receiver includes an adjustable impedance network including an input for receiving a radio frequency signal, a plurality of control inputs, and an output. The receiver further includes a micro controller unit (MCU) configured to control the adjustable impedance network to decrease an input impedance in a terrestrial mode and to increase the input impedance in a cable mode.

BRIEF DESCRIPTION OF THE DRAWINGS

In the following discussion, reference numerals are reused to indicate the same or similar elements in the various illustrated examples.

DETAILED DESCRIPTION OF ILLUSTRATIVE EMBODIMENTS

Embodiments of a receiver circuit are described below that include an adjustable impedance network configurable to provide a good noise factor in a first mode for terrestrial broadcast reception and to provide a good return loss in a second mode for cable broadcast reception. In a particular example, an adjustable impedance network is provided where each of the resistors can be coupled to the input node in a first mode to provide a desired noise factor and where some of the resistors can be disconnected from the input node in a second mode to provide good return loss, while increasing the transconductance and keeping the linearity approximately the same. An example of a system including the adjustable impedance network is described below with respect to FIG. 1.

Figure 1:
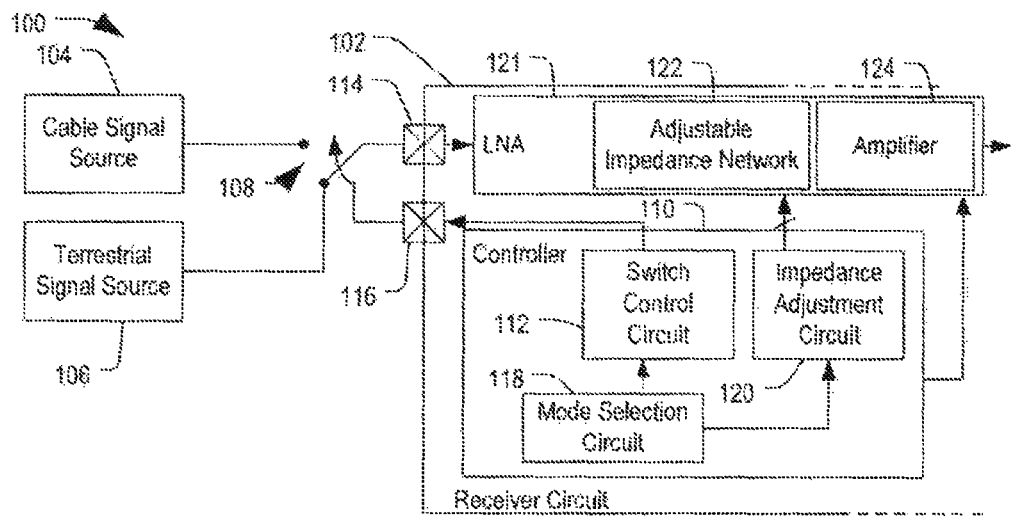
FIG. 1 is a block diagram of an embodiment of a system including a receiver having an adjustable impedance network that can be controlled for terrestrial and cable modes.

FIG. 1 is a block diagram of an embodiment of a system 100 including a receiver 102 having an adjustable impedance network 122 that can be controlled for terrestrial and cable modes. System 100 includes a cable signal source 104 and a terrestrial signal source 106, which can be selectively coupled to a radio frequency (RF) input pad 114 through a switch 108, which is coupled to a control pad 116.

Receiver circuit 102 includes a low noise amplifier (LNA) 121 having an input coupled to pad 114, a control input coupled to a controller 110, and an output, which may be coupled to an input of another circuit, such as a mixer. LNA 121 includes adjustable impedance network 122 and an amplifier 124. Controller 110 includes a mode selection circuit 118 coupled to a switch control circuit 112 and an impedance adjustment circuit 120. Switch control circuit 112 includes an output coupled to pad 116 for providing a control signal to control switch 108. Impedance adjustment circuit 120 includes at least one output coupled to adjustable impedance network 122. In this example, the output of impedance adjustment circuit 120 provides a multi-bit signal or control word for controlling the adjustable impedance network 122.

In an example, controller 110 controls the switch 108 to selectively couple one of a cable television signal and a terrestrial television signal to RF input pad 114 using switch control circuit 112. Mode selection circuit 118 controls impedance adjustment circuit 120 to configure adjustable impedance network 122 for the selected mode (i.e., terrestrial or cable). In a first mode, impedance adjustment circuit 120 activates a plurality of transistors of adjustable impedance network 122 to provide a relatively small input impedance and a good noise factor. In a second mode, impedance adjustment circuit 120 deactivates at least some of the plurality of transistors of the adjustable impedance network 122 to provide a higher input impedance and a good return loss. LNA 121 receives the signal, provides the tuned impedance using adjustable impedance network 122, and amplifies the signal.

While in the illustrated example an external switch 10S couples the cable signal or the terrestrial signal to RF input pad 114, separate connectors may be provided for cable or terrestrial television inputs. Alternatively, a single input can be provided and controller 110 configures adjustable impedance network 122 according to the operating mode. One example of a system including a receiver circuit without an external switch between the signal source and the RF input pad 114 is described below with respect to FIG. 2.

Figure 2:
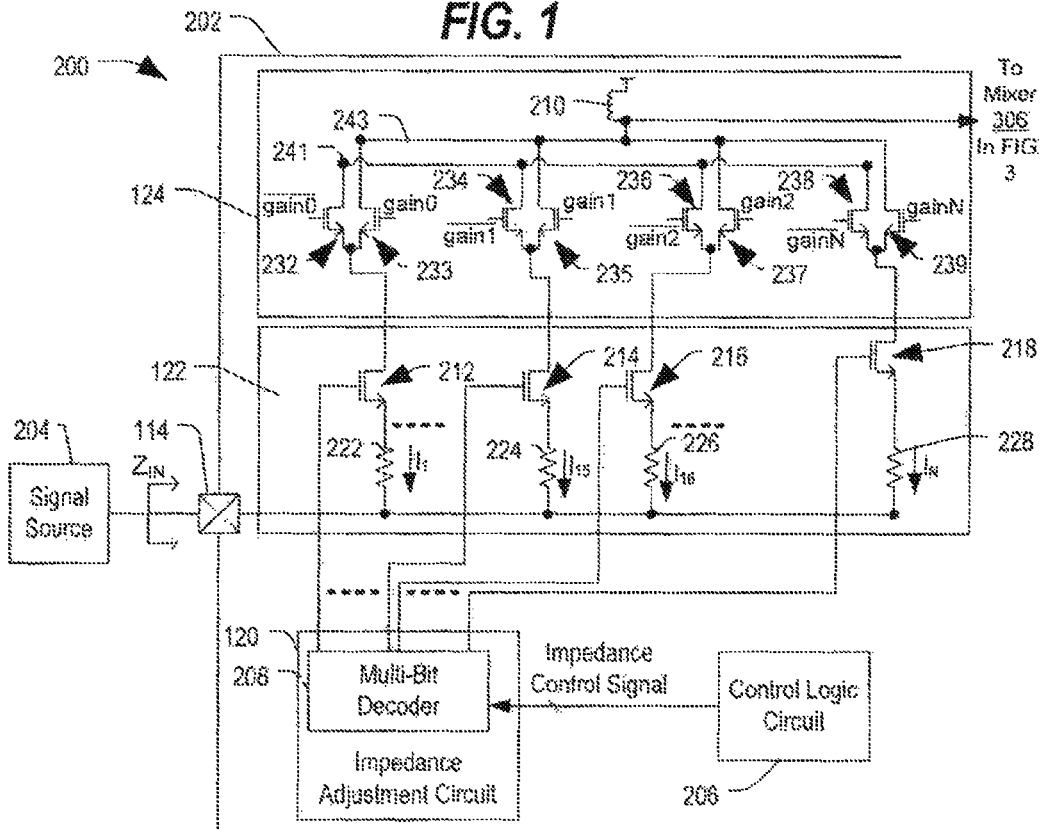
FIG. 2 is a partial block diagram and partial circuit diagram of a second embodiment of a system having the adjustable impedance network of FIG. 1 that can be controlled for terrestrial and cable modes.

FIG. 2 is a partial block diagram and partial circuit diagram of a second embodiment of a system 200 having the adjustable impedance network 122 of FIG. 1 that can be controlled for terrestrial and cable modes. System 200 includes a receiver circuit 202 coupled to a signal source 204 through RF input pad 114. Signal source 204 can be cable signal source 104, such as a coaxial cable, a terrestrial signal source 106, such as an antenna, or another broadcast signal source. In this particular example, RF input pad 114 represents an interface that can connect to signal source 204.

Receiver circuit 202 includes adjustable impedance network 122 for providing a selected impedance to input pad 114. Impedance network 122 includes multiple transistors 212, 214, 216, and 218, and multiple resistors 222, 224, 226, and 228 coupled to RF input pad 114. Receiver circuit 202 also includes an amplifier circuit 124 and a load circuit, such as inductor 210. Inductor 210 includes a first terminal coupled to a supply terminal and a second terminal coupled to a node 243.

Amplifier circuit 124 includes transistors 232, 233, 234, 235, 236, 237, 238, and 239. Transistor 232 includes a drain coupled to a node 241, which is a low impedance node configured to sink RF current when transistors 232, 234, 236, and 238 are biased to allow current flow. In an example, node 241 may be shunted to ground by a large capacitor and an amplifier (not shown). Transistor 232 also includes a gate for receiving a control signal and a source coupled to a drain of transistor 212 and a source of transistor 233. Transistor 233 includes a drain coupled to node 243 and a gate for receiving a control signal. Transistor 234 includes a drain coupled to node 241, a gate for receiving a control signal, and a source coupled to a drain of transistor 214 and to a source of transistor 235. Transistor 235 includes a drain coupled to node 243 and a gate for receiving a control signal. Transistor 236 includes a drain coupled to node 241, a gate for receiving a control signal, and a source coupled to a drain of transistor 216 and to a source of transistor 237. Transistor 237 includes a drain coupled to node 243 and a gate for receiving a control signal. Transistor 238 includes a drain coupled to node 241, a gate for receiving a control signal, and a source coupled to a drain of transistor 218 and to a source of transistor 239. Transistor 239 includes a drain coupled to node 243 and a gate for receiving a control signal. The control signals applied to the gates of transistors 232, 234, 236, and 238 are configured to be of opposite polarity to the complementary signals applied to transistors 233, 235, 237, and 239, such that, for example, transistor 232 is biased to allow current flow when transistor 233 is turned off, and vice versa. The gates of transistors 232, 233, 234, 235, 236, 237, 238, and 239 are coupled to outputs of an automatic gain control circuit (such as RF AGC 340 in FIG. 3).

Transistor 212 includes a drain coupled to the sources of transistors 232 and 233, a gate, and a source coupled to a first terminal of resistor 222, which has a second terminal coupled to RF input pad 114. Transistor 214 includes a drain coupled to the sources of transistors 234 and 235, a gate, and a source coupled to a first terminal of resistor 224, which has a second terminal coupled to RF input pad 114. Transistor 216 includes a drain coupled to the sources of transistors 236 and 237, a gate, and a source coupled to a first terminal of resistor 226, which has a second terminal coupled to RF input pad 114. Transistor 21S includes a drain coupled to the sources of transistors 235 and 239, a gate, and a source coupled to a first terminal of resistor 228, which has a second terminal coupled to RF input pad 114.

While only four transistors are shown, adjustable impedance network 122 can include any number of transistors. Further, while a corresponding number of pairs of transistors are shown, amplifier circuit 124 can include any number of transistor pairs. In an example, amplifier circuit 124 includes two transistors for each transistor 61 adjustable impedance network 122. In a particular example, adjustable impedance network 122 includes 31 transistors and amplifier circuit 124 includes 62 transistors arranged into 31 transistor pairs, each of which has a common source node coupled to one of the 31 transistors of the adjustable impedance network 122. In an example, the transistors 212, 214, 216, and 218 and resistors 222, 224, 226, and 228 are matched such that each transistor/resistor combination produces substantially the same current when similarly biased. In an example, each of the transistors 212, 214, 216, and 218 has the same width-to-length ratio (within limits of manufacturing tolerances), and the resistors 222, 224, 226, and 228 have substantially equal resistances.

Impedance adjustment circuit 120 includes a multi-bit decoder 208, which has an input coupled to an output of a control logic circuit 206 for receiving an impedance control signal (or control word) having multiple bits. Multi-hit decoder 208 includes multiple outputs, where each output is coupled to one of the gates of transistors 212, 214, 216, and 218.

In an example, in a terrestrial mode, control logic circuit 206 provides an impedance control signal to multi-bit decoder 208 to control adjustable impedance network to activate each of transistors 212, 214, 216, and 218, producing currents ($I_1, \ldots, I_{15}, I_{16}, \ldots,$ and $I_{31}$). In this instance, each of the currents ($I_1$ through $I_{31}$ are equal and the transconductances (gm) of the transistors 212, 214, 216, and 218 is also equal. When each of transistors 212, 214, 216, and 218 are activated, the input impedance as seen from the perspective of signal source 204 is determined according to the following equation:

$$ZIN = \frac{\frac{1}{gm} + R}{N} \quad (1)$$

where (N) is the number of active transistors. Any number of transistors can be used. However, in this example, thirty-one transistors provides a relatively small input impedance and a very good noise factor for terrestrial signal reception. Further, since transistors 212, 214, 216, and 218 are matched and resistors 222, 224, 226, and 228 are also matched, currents ($I_1$, $I_{15}$, $I_{16}$, and $I_N$) are substantially equal (with some potential variation due to manufacturing tolerances).

In a cable mode, control logic circuit 206 can turn off one or more of the transistors 212, 214, 216, and 218 to provide enhanced impedance matching to provide a good return loss (RL), which can be determined according to the following equation:

$$RL = \frac{R_{204} - Z_{IN}}{R_{204} + Z_{IN}} \quad (2)$$

where the variable R204 refers to the resistance of signal source 204 (e.g., an antenna resistance). In this instance, the input impedance ($Z_{IN}$) of RF input pad 114 is impacted by adjustable impedance network 122 and, as the transistors 216 and 218 are turned off, the transconductance (gm) of the active transistors 212 through 214 increases as does the current flowing through them. In the example where transistors 216 through 218 are turned off, the input impedance is defined by the following equation:

$$ZIN = \frac{\frac{1}{1.41 * gm} + R}{15} \quad (3)$$

wherein the number (15) represents the number of active transistors (after turning off 16 through 31, i.e., transistors 216 through 218). The transconductance for each transistor increases by a factor of 1.41 producing a relatively large input impedance. Though the transconductance increases, linearity is maintained. In this example, the currents flowing through transistors 212 and 214 and through resistors 222, and 224 are substantially equal. Further, since half of the transistors (216 through 228) are turned off, twice the current is flowing through transistors 212 and 214 as when all of the transistors 212, 214, 216, and 218 are active.

Node 241 is a low impedance node, which operates to sink RF current when transistors 232, 234, 236, and/or 238 are turned on. When transistors 233, 235, 237, and 239 are turned on, transistors 232, 234, 236, and 238 are off, and node 243 operates as a relatively high impedance node coupled to the input of mixer 306 in FIG. 3.

Figure 3:
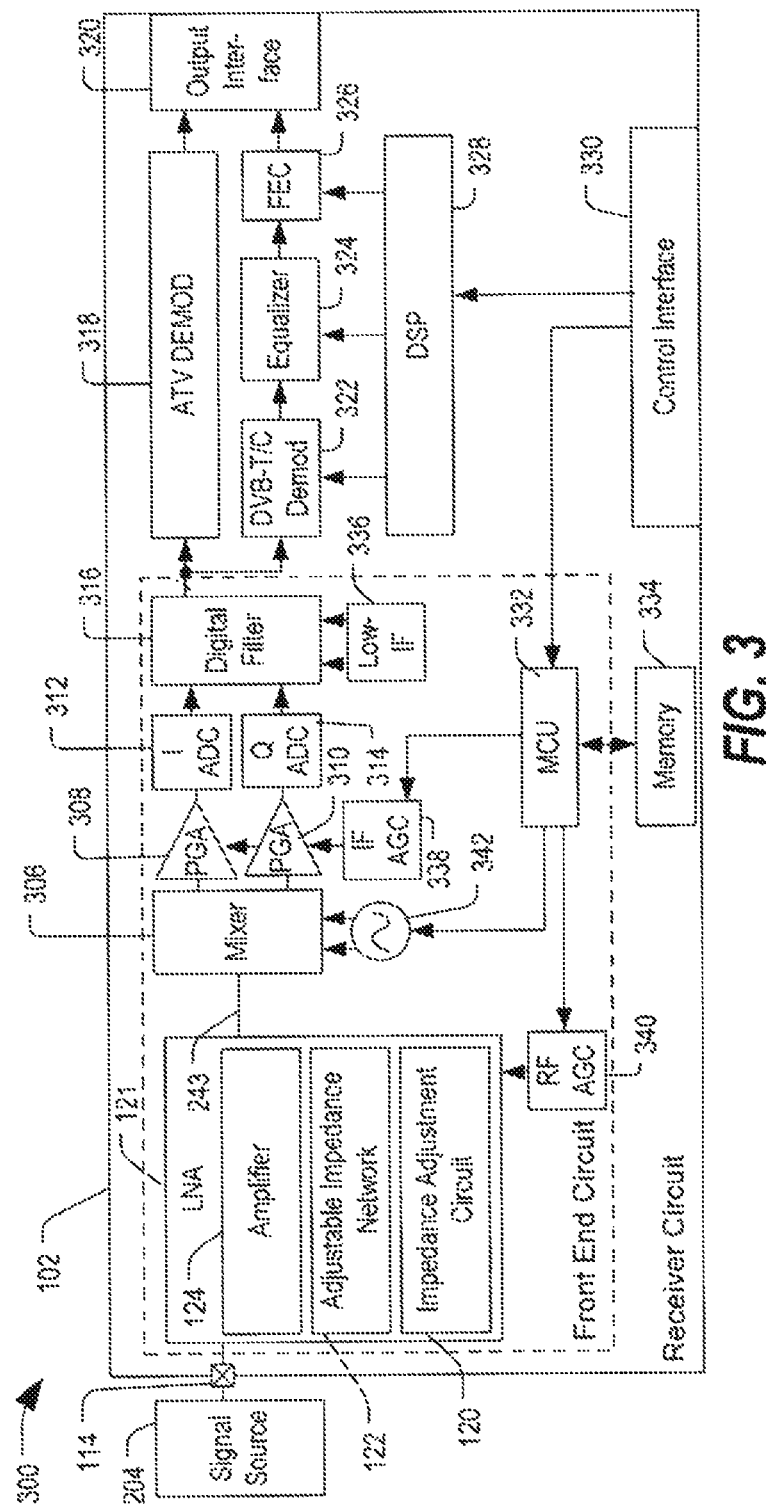
FIG. 3 is a block diagram of an embodiment of a system including a receiver circuit having the adjustable impedance network of FIGS. 1 and 2.

FIG. 3 is a block diagram of an embodiment of a system 300 including a receiver circuit 102 having the adjustable impedance network 122 of FIGS. 1 and 2. System 300 includes signal source 204 coupled to RF input pad 114. Receiver circuit 102 further includes a low noise amplifier (LNA) 121 having an input coupled to pad 114 and an output coupled to an input of mixer 306. LNA 121 includes adjustable impedance network 122 and amplifier 124. Further, LNA 121 includes impedance adjustment circuit 120.

Mixer 306 downconverts the signal to in-phase and quadrature intermediate frequency (IF) signals, which are provided to outputs coupled to inputs of programmable gain amplifiers (PGAs) 308 and 310, respectively. PGA 308 includes an output coupled to an input of an in-phase (I) analog-to-digital converter (ADC) 312, which has an output coupled to an input of a digital filter 316. PGA 310 includes an output coupled to an input of a quadrature (Q) analog-to-digital converter (ADC) 314, which has an output coupled to an input of digital filter 316. The front end circuit further includes a micro controller unit (MCU) 332, which is coupled to an RF automatic gain control (AGC) circuit 340, an IF AGC circuit 338, and a low-IF circuit 336. RF AGC circuit 340 includes an output coupled to a control input of LNA 121. IF AGC circuit 338 includes an output coupled to control inputs of PGAs 308 and 310. Low-IF circuit 336 includes outputs coupled to control inputs of digital filter 316. The front end circuit further includes a local oscillator 342 having a control input coupled to MCU 332 and first and second outputs coupled to control inputs of mixer 306 to provide an in-phase mixing signal and a quadrature mixing signal. MCU 332 includes an input/output interface coupled to a memory 334 for retrieving instructions and/or data.

Receiver 102 further includes an analog television demodulator 318 having an input coupled to an output of digital filter 316 and an output coupled to an input of an output interface 320. Receiver 102 also includes a digital video broadcast terrestrial/cable (DVB-T/C) demodulator 322 having an input coupled to the output of digital filter 316, an input coupled to an output of digital signal processor (DSP) 328, and an output coupled to an input of equalizer 324. Equalizer 324 includes an input coupled to an output of DSP 328, and an output coupled to an input of a forward error correction (FEC) circuit 326, which has a second input coupled to an output of DSP 328 and an output coupled to an input of output interface 320. DSP 328 includes a control input coupled to an output of a control interface 330, which may be coupled to a host system for receiving control and other signals. Control interface 330 also includes an output coupled to MCU 332.

In a first mode, MCU 332 controls impedance adjustment circuit 120 to configure adjustable impedance network 122 for receiving one of a cable signal or a terrestrial signal. In operation, receiver 102 functions as a television receiver adapted to receive and demodulate television channels. MCU 332 is configured to control the various elements, including impedance adjustment circuit 120, which controls adjustable-impedance network 122.

A received RF signal from signal source 204 is provided to the input of LNA 121, which operates under the control of MCU 332 via RF AGC 340 and via impedance adjustment circuit 120 to provide a signal having a suitable amplitude to the input of mixer 306. Mixer 306 is a quadrature mixer that mixes the filtered input signal with the signals from local oscillator 342 to mix a selected channel to IF. In an example, receiver 102 has an IF that is selectable in the range of 3 to 5 megahertz (MHz), and thus receiver 102 is configurable as a low-IF architecture. To achieve the desired IF, local oscillator 342 is tuned to a frequency that mixes the selected channel to the desired IF, under the control of MCU 332. Mixer 306 provides the in-phase IF signal to PGA 308, which amplifies the IF signal and provides the amplified IF signal to t-ADC 312, which provides a digital output signal to digital filter 316. Mixer also provides the quadrature IF signal to PGA 310, which amplifies the Q-IF signal and provides and amplified version to Q-ADC 314, which provides a digital output signal to digital filter 316.

Digital filter 316 provides the output signals to tuner circuitry, including analog television demodulator 318 and DVB-T/C demodulator 322, which demodulate the video signal. Analog television demodulator 318 provides the demodulated output to output interface 320, which may be coupled to an audio/video system on a chip or other multimedia circuit. DVB-T/C demodulator 322 provides the output to equalizer 324, which adjusts the relative strength of selected frequencies within the demodulated output signal and provides the adjusted signal to FEC 326. FEC 326 uses forward error correction to correct signal errors and provides the corrected signal to output interface 320.

In general, inclusion of adjustable impedance network 122 into LNA 121 simplifies the overall circuit design, in that the receiver 102 can automatically adjust the input impedance of receiver 102 according to an operating mode (terrestrial or cable mode) to provide a good noise figure or a good return loss as desired.

Figure 4:
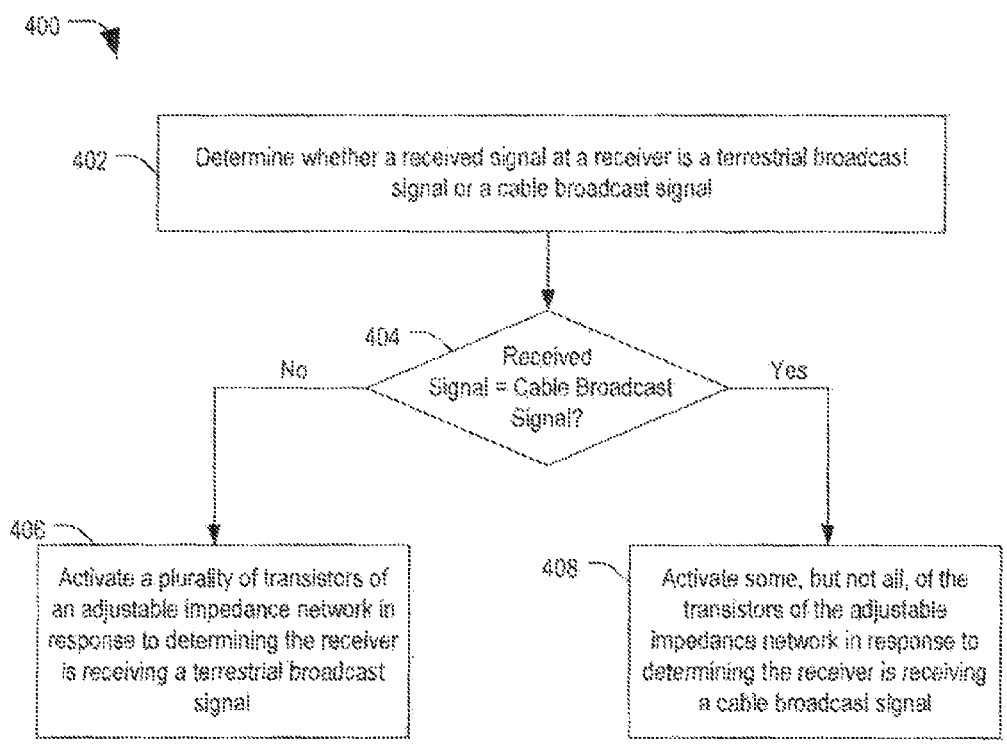
FIG. 4 is a flow diagram of an embodiment of a method of controlling an impedance of an adjustable impedance network as a function of a mode of a receiver, such as the receiver circuits of FIGS. 1-3.

FIG. 4 is a flow diagram of an embodiment of a method 400 of controlling an impedance of an adjustable impedance network as a function of a mode of a receiver, such as the receiver circuits of FIGS. 1-3. At 402, a controller determines a receiving mode of a receiver, where the receiving mode includes one of a terrestrial mode or a cable mode. Advancing to 404, if the receiving mode is not a cable mode, the method 400 advances to 406 and the controller activates a plurality of transistors of an adjustable impedance network in response to determining the receiving mode is a terrestrial mode. By activating the plurality of transistors, the controller reduces an input impedance of the receiver and provides a relatively good noise factor suitable for terrestrial broadcast reception. At 404, if the receiving mode is a cable mode, the method 400 advances to 408 and the controller activates some, but not all, of the transistors of the adjustable impedance network in response to determining the receiving mode is a cable mode. By activating some but not all of the transistors, the controller increases an input impedance of the receiver and provides a relatively good return loss by substantially matching an impedance of a signal source, such as a coaxial cable.

In an embodiment, the controller provides a control signal to an impedance adjustment circuit, which decodes the control signal to produce driver signals for activation of selected transistors according to determining the receiving mode. In an example, the transistors have approximately (or substantially) equal transconductances (within limits of manufacturing tolerances). In an example, in the terrestrial mode when all of the transistors are activated, the adjustable impedance network has a first impedance. In the cable mode when some but not all of the transistors are activated, the adjustable impedance network has a second impedance that is higher than the first impedance. In one instance, such as the example of FIG. 2, the adjustable impedance network includes thirty-one transistors, and activating some, but not all, of the transistors includes activating fifteen of the thirty-one transistors. In another instance where the adjustable impedance network has some number of transistors, half of the transistors are activated. In general, any number of transistors can be activated or deactivated in the cable mode to provide a desired impedance to reduce return loss.

In conjunction with the circuits described above with respect to FIGS. 1-3, a circuit is disclosed that includes an adjustable impedance network having multiple switches that are selectable to provide a suitable input impedance and return loss according to the operating mode of the receiver. In a first (terrestrial) mode, a controller activates the switches of the adjustable impedance network to reduce the input impedance and to provide a good noise factor for terrestrial broadcast reception. In a second (cable) mode, the controller deactivates at least some of the switches to increase the input impedance and to provide good return loss for cable broadcast reception.

Although the present invention has been described with reference to preferred embodiments, workers skilled in the art will recognize that changes may be made in form and detail without departing from the scope of the invention.

What is claimed is:

1. A low-noise amplifier (LNA) for a receiver circuit, the LNA comprises:
   amplifier circuitry including a plurality of input nodes and an output;
   an adjustable impedance network including an input for receiving a radio frequency signal and a plurality of control inputs, the adjustable impedance network including:
      a plurality of transistors, each of the plurality of transistors including a drain and a source coupled between the input of the adjustable impedance network and a respective one of the plurality of input nodes of the amplifier circuitry, and including a gate coupled to one of the plurality of control inputs; and
   a controller coupled to the plurality of control inputs and configured to control an impedance of the adjustable impedance network to provide a first impedance in a terrestrial mode and to provide a second impedance in a cable mode.

2. The LNA of claim 1, wherein the first impedance is configured to substantially match an impedance of a cable providing the radio frequency signal.

3. The LNA of claim 1, wherein the adjustable impedance network further comprises:
   a plurality of resistors, each of the plurality of resistors coupled between one of the plurality of transistors and the input of the adjustable impedance network.

4. The LNA of claim 1, wherein the controller activates the plurality of transistors in the terrestrial mode.

5. The LNA of claim 1, wherein the controller deactivates some of the plurality of transistors in the cable mode.

6. The LNA of claim 1, wherein the plurality of transistors have substantially equal width-to-length ratios.

7. The LNA of claim 1, wherein the plurality of transistors have substantially equal resistances.

8. A method comprising:
   determining a receiving mode of a receiver, the receiving mode including one of a terrestrial mode and a cable mode; and
   activating a plurality of transistors of an adjustable impedance network in response to determining the receiving mode is a terrestrial mode; and
   activating some, but not all, of the plurality of transistors of the adjustable impedance network in response to determining the receiving mode is a cable mode;
   wherein:
      in the terrestrial mode, the plurality of activated transistors provide a first impedance; and
      in the cable mode, the plurality of activated transistors provide a second impedance.

9. The method of claim 8, wherein activating the plurality of transistors comprises reducing an input impedance of the receiver.

10. The method of claim 8, wherein activating some, but not all, of the transistors comprises increasing an input impedance of the receiver.

11. The method of claim 8, wherein before activating, the method further comprises:

providing a control signal to an impedance adjustment circuit; and decoding the control signal within the impedance adjustment circuit to produce driver signals for activation of selected transistors according to determining the receiving mode.

12. The method of claim 8, wherein each transistor of the plurality of transistors that is activated has an impedance that is approximately equal to impedances of other transistors of the plurality of transistors.

13. The method or claim 8, wherein the second impedance is greater than the first impedance.

14. The method of claim 8, wherein activating some, but not all, of the transistors of the adjustable impedance network comprises activating approximately half of the plurality of transistors of the adjustable impedance network.

15. A receiver comprising:

a low noise amplifier including an adjustable impedance network and an amplifier circuit including a plurality of input nodes, the low noise amplifier including an input for receiving a radio frequency signal, a plurality of control inputs, and an output, the adjustable impedance network including a plurality of transistors, each of the plurality of transistors including a drain, a source, and a gate, one of the drain and the source coupled to one of the plurality of input nodes of the amplifier circuit, and the gate coupled to one of the plurality of control inputs; and a controller configured to control the adjustable impedance network to provide a first input impedance in a terrestrial mode and to provide a second input impedance in a cable mode.

16. The receiver of claim 15, wherein, in the cable mode, the input impedance substantially matches an impedance of a transmission line providing the radio frequency signal.

17. The receiver of claim 15, wherein the adjustable impedance network further comprises:

a plurality of resistors, each of the plurality of resistors including a first terminal coupled between one of the plurality of transistors and the input of the adjustable impedance network.

18. The receiver of claim 17, wherein:

in the terrestrial mode, the controller controls the adjustable impedance network to provide a first impedance; and in the cable mode, the controller controls the adjustable impedance network to provide a second impedance.

19. The receiver of claim 18, wherein the second impedance is greater than the first impedance.

20. The receiver of claim 17, wherein the plurality of transistors and the plurality of resistors are substantially matched.

21. The receiver of claim 17, wherein:

in the terrestrial mode, the controller activates each of the plurality of transistors and each of the plurality or transistors conducts a first current that is substantially equal to currents conducted by others of the plurality of transistors; and in the cable mode, the controller activates some, but not all, of the plurality of transistors and each of the plurality of transistors conducts a second current that is substantially equal to currents conducted by other active ones of the plurality of transistors; and wherein the second current is greater than the first current.

22. The receiver of claim 15, wherein the controller comprises a micro-controller unit.

\* \* \* \* \*